United States Patent [19]

Richards et al.

[11] Patent Number: 5,762,676
[45] Date of Patent: Jun. 9, 1998

[54] PRODUCT FOR MOLDING GLASS LENSES HAVING DIFFICULT SHAPES

[75] Inventors: David A. Richards, Rochester; John C. Pulver, Spencerport, both of N.Y.

[73] Assignee: Eastman Kodak Company, Rochester, N.Y.

[21] Appl. No.: 639,584

[22] Filed: Apr. 29, 1996

Related U.S. Application Data

[60] Provisional application No. 60/002,043, Aug. 8, 1995.

[51] Int. Cl.$^6$ .......................... C03B 21/00; C03B 40/00
[52] U.S. Cl. .......................... 65/102; 65/26; 65/168; 65/169; 65/170; 65/286; 65/305; 65/374.1
[58] Field of Search ................... 65/26, 168, 169, 65/170, 286, 292, 305, 317, 362, 374.1, 374.11, 374.12, 374.13, 64, 102, 104

[56] References Cited

U.S. PATENT DOCUMENTS

| | | | |
|---|---|---|---|
| 3,833,347 | 9/1974 | Angle et al. | 65/32 |
| 4,059,428 | 11/1977 | Andrews | 65/33 |
| 4,168,961 | 9/1979 | Blair | 65/66 |
| 4,591,373 | 5/1986 | Sato | 65/29 |
| 4,629,487 | 12/1986 | Monji et al. | 65/26 |
| 4,721,518 | 1/1988 | Monji et al. | 65/374.11 |
| 4,797,144 | 1/1989 | DeMeritt et al. | 65/102 |
| 4,883,525 | 11/1989 | Buckley et al. | 65/37 |
| 4,887,791 | 12/1989 | Tangari et al. | 249/115 |
| 4,889,548 | 12/1989 | Kriegesmann et al. | 65/305 |
| 5,028,251 | 7/1991 | Schinker et al. | 65/374.11 |
| 5,125,945 | 6/1992 | Menihan et al. | 65/102 |
| 5,125,949 | 6/1992 | Hirota et al. | 65/26 |
| 5,171,348 | 12/1992 | Umetani et al. | 65/26 |
| 5,173,100 | 12/1992 | Shigyo et al. | 65/102 |
| 5,380,349 | 1/1995 | Taniguchi et al. | 65/286 |

FOREIGN PATENT DOCUMENTS

| | | | |
|---|---|---|---|
| 62-292641 | 12/1987 | Japan | 65/374.1 |
| 63-95130 | 4/1988 | Japan | 65/374.1 |
| 2-172831 | 7/1990 | Japan | 65/64 |

OTHER PUBLICATIONS

Weast, Robert. CRC Handbook of Chemistry and Physics, 60th Ed. pp. D-187-D-189, 1979.
Perry, Robert. Chemical Engineers' Handbook, 5th Ed. pp. 3-100, 1980.
Rodgers, Steve. "Tooling Materials for Composites Manufacture". Advanced Materials & Processes, pp. 47-51, Apr. 1990.

*Primary Examiner*—Donald E. Czaja
*Assistant Examiner*—Michael P. Colaianni
*Attorney, Agent, or Firm*—Svetlana Z. Short

[57] ABSTRACT

An improved tool is provided for pressing glass into a precision optical element having a strong concave surface. The tool is selected from ceramic and metal materials having coefficients of thermal expansion greater than the coefficient of the pressed glass. Preferred tools include a base material selected from Invar, steel and alumina with a surface layer selected from alumina, zirconia, chromium oxide and chromium carbide, having a finished thickness in the range between ten to two thousand angstroms.

9 Claims, 2 Drawing Sheets

PRODUCT FOR MOLDING GLASS LENSES HAVING DIFFICULT SHAPES

CROSS REFERENCE TO RELATED APPLICATION

Reference is made to and priority claimed from U.S. Provisional Application Ser. No. 60/002,043, filed 08 Aug., 1995, entitled PRODUCT AND PROCESS FOR MOLDING GLASS LENSES HAVING DIFFICULT SHAPES

FIELD OF INVENTION

The invention relates to the field of optics and to products and processes for molding glass lenses. More specifically, the invention relates to tools and processes for pressing glass preforms into precision optics having shapes previously considered difficult to mold with precision.

BACKGROUND OF THE INVENTION

Precision optical elements traditionally are manufactured from glass blanks in a multi-step process that includes separate operations for rough and fine grinding and polishing. Quality can be outstanding, but the process is slow with many interruptions for measurements and changeovers. Results often are inconsistent, depending on the skill and experience of the operator. Aspheric shapes, considered desirable in many optical systems, are particularly difficult to produce with traditional methods.

More recent processes use compression molding to press glass into acceptable lens elements without further finishing. Molding tools surfaced with a durable ceramic have been fabricated that are suitable for pressure molding certain glasses into precision optical elements. The shape of the optical surface is formed by pressure against the molding tool without grinding or polishing. Examples are disclosed by Blair, Angle and others in U.S. Pat. No. 3,833,347, issued Sep. 3, 1974; and No. 4,168,961, issued Sep. 25, 1979.

Although recent molding techniques provide many advantages for certain optical shapes, other desirable shapes have proven more difficult, due in part to the relative coefficients of thermal expansion of the molded glass and the molding tools. A strong negative element of BK-7 crown glass, for example, is particularly difficult to mold with prior art tools. The coefficient of thermal expansion typically is lower for the tool than the glass. As described more fully in the detailed description of the invention, we have found that the concave surface of the glass grips the tool on cooling, imparting stresses in the glass and unwanted distortions when the glass is released from the tool. The stresses sometimes crack the glass, but even less dramatic distortions are beyond acceptable tolerances.

SUMMARY OF THE INVENTION

The present invention is directed to overcoming one or more of the problems set forth above. Briefly summarized, according to one aspect of the invention, an improved tool is provided for pressing glass into a precision optical element having a strong concave surface. The tool is selected from ceramic and metal materials having coefficients of thermal expansion greater than the coefficient of the pressed glass. Typical optical glasses have coefficients of thermal expansion in the range between sixty times ten to the minus seven per degree centigrade ($60 \times 10^{-7}/°$ C.) and one hundred times ten to the minus seven per degree centigrade ($100 \times 10^{-7}/°$ C.). Tools according to the preferred embodiment of the invention are selected from Invar, steel and alumina having coefficients in the range between seventy times ten to the minus seven per degree centigrade ($70 \times 10^{-7}/°$ C.) and one hundred and ten times ten to the minus seven per degree centigrade ($110 \times 10^{-7}/°$ C.). The tool also may have a surface layer over a base material. The surface layer and the base material have coefficients of thermal expansion that are sufficiently close to maintain the integrity of the tool, or the surface material is thin enough to take on the expansion characteristics of the base material without losing adhesion to the base material. Preferred surface layers are selected from alumina, zirconia, chromium oxide and chromium carbide having a finished thickness in the range of between ten to two thousand angstroms.

The invention also includes a method of making a tool for pressing glass into precision optical elements having a strong concave surface. A base of the tool is formed from ceramics or metals having a coefficient of thermal expansion greater than the coefficient of the glass, and the base material is provided with a thin surface layer selected from alumina, zirconia, chromium oxide and chromium carbide having a coefficient of thermal expansion greater than the coefficient of the glass.

The invention further includes a method of molding precision optics from a glass preform, characterized by: 1) heating and pressing a tool against the preform to mold the preform into a precision optical element having a strong concave surface; and 2) cooling the tool and optical element so the tool shrinks faster than the element. More specifically, the tool has a coefficient of thermal expansion greater than the optical element so the tool shrinks faster than the element during cooling.

According to the invention, strong negative surfaces can be pressed into optical glass with significantly reduced distortions.

These and other features and advantages of the invention will be more clearly understood and appreciated from a review of the following detailed description of the preferred embodiments and appended claims, and by reference to the accompanying drawings.

BRIEF DESCRIPTION OF THE DRAWINGS

FIG. 2 depicts the tools separated before a molding operation. FIG. 3 depicts the tools together during the molding operation.

DETAILED DESCRIPTION OF THE INVENTION

Figure 1:
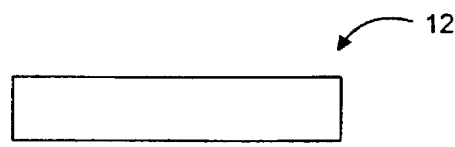
FIG. 1 is a cross-sectional view of a glass preform.
Figure 2:
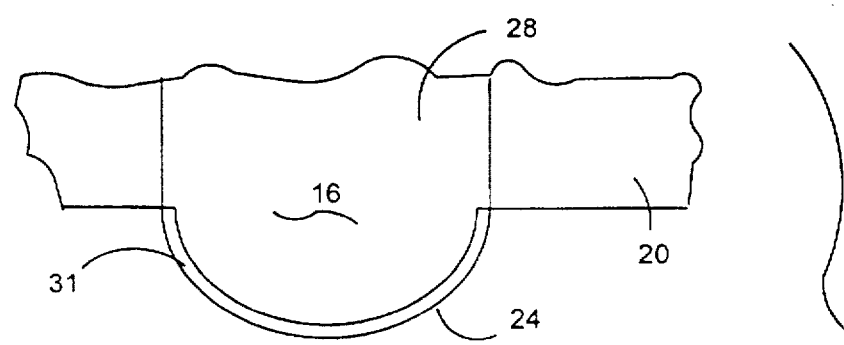
FIGS. 2 and 3 are cross-sectional views of mold parts including tools for molding the preform of FIG. 1 into a precision optical element according to a preferred embodiment of the invention.
Figure 2:
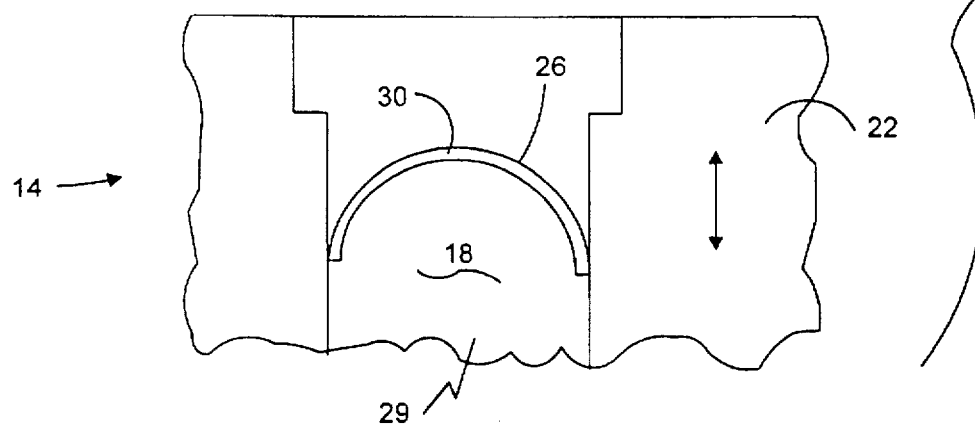
Figure 3:
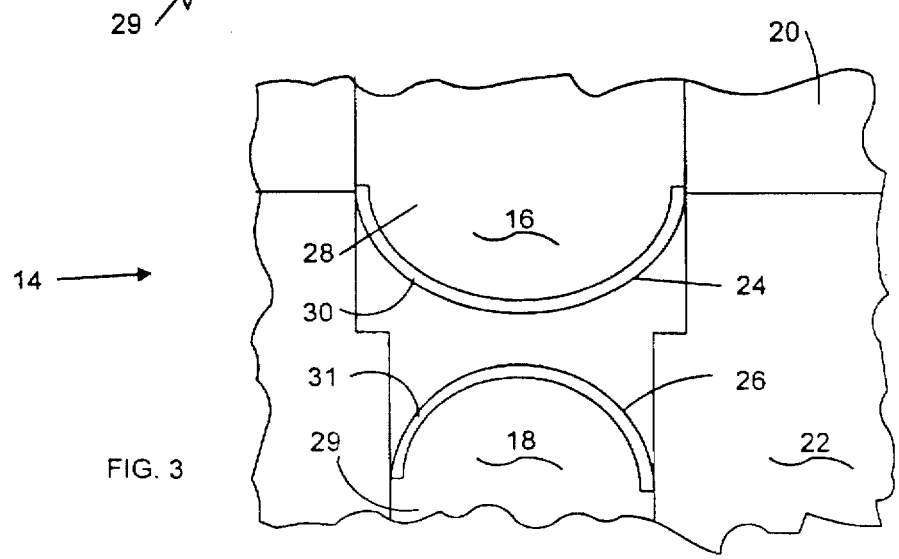

Referring now to the drawings, and beginning with FIGS. 1-3, a preferred embodiment of the invention is depicted including a preform 12 (FIG. 1) and pressure mold 14 (FIGS. 2 and 3). The preform 12 is used to manufacture a precision optical element under pressure between tools or tool inserts 16 and 18, also called nubbins. Compression between the upper and lower mold bodies 20 and 22 captures and presses the preform against tool surfaces 24 and 26, changing the shape of the preform and remapping its surface according to the configuration of the tool surfaces.

Preform 12 is a plano-plano circular disk of a high temperature optical glass, such as a crown glass molded at a temperature of approximately seven hundred degrees centigrade (700° C.). The preform, which has a thickness of approximately three and a half millimeters (3.5 mm) and a diameter of approximately fifteen millimeters (15 mm), is used to form a negative precision optical element having a strong concave surface.

The preform 12 has expansion characteristics that are significantly greater than prior art tooling materials. Silicon carbide, for example, has a coefficient of thermal expansion of approximately forty six times ten to the minus seven per degree centigrade ($46 \times 10^{-7}$/° C.), compared to typical optical glasses which have corresponding coefficients ranging from sixty times ten to the minus seven per degree centigrade ($60 \times 10^{-7}$/° C.) to one hundred times ten to the minus seven per degree centigrade ($100 \times 10^{-7}$/° C.).

When a high temperature optical glass is molded with prior art tools into a precision optical element having a strong negative surface, we have found that the glass, grips the tool on cool down. Before release from the tool, significant stress is supported in the outer zones of the optical element. If release is achieved without breaking the element, the stress relieves itself by bending the glass surface slightly. Even small distortions are outside the permitted tolerances for high quality surfaces.

A hemispherical optical surface having a twenty millimeter (20 mm) diameter, formed in glass having a coefficient of thermal expansion of seventy five times ten to the minus seven per degree centigrade ($75 \times 10^{-7}$/° C.), provides a good example of the problem. Compared to silicon carbide tools, the difference in size from molding temperature, when the glass and tool are equal, to ambient temperature after cool down, is over half of a millimeter (0.5 mm). Cracking of the optical element likely will result.

According to the present invention, high temperature optical glasses having strong negative surfaces are molded with tools having coefficients of thermal expansion that are greater than the molded glass. Referring to FIGS. 2 and 3, the tools preferably include a substrate or core material 28 and 29 and a surface layer 30 and 31. Preferred core materials are selected from ceramics and metals preferably from the group consisting primarily of Invar, steel and alumina. Preferred surface layers are selected from ceramics, preferably from the group consisting primarily of alumina, zirconia, chromium oxide and chromium carbide. The base materials have coefficients of thermal expansion ranging from approximately seventy times ten to the minus seven per degree centigrade ($70 \times 10^{-7}$/° C.), to one hundred and ten times ten to the minus seven per degree centigrade ($110 \times 10^{-7}$/° C.). The surface layers are selected to match approximately the coefficient of the base material.

Alumina, zirconia and chromium oxide surface layers match alumina and Invar base materials, while zirconia and chromium carbide match steel.

The tool base material is selected as described above to provide a coefficient of thermal expansion that is greater than the preform glass. The surface layer is selected for several properties. It is a ceramic like material that will not react adversely with the glass, can be polished or otherwise prepared to a high surface quality appropriate for molding precision optics, and, it will remain on the core as an integral part of the tool without separation during repeated cycles of heating to molding temperatures and cooling to ambient temperatures. Preferred surface layers range in finished thickness from ten to two thousand angstroms. If the surface layer is near the thick end of the range, its coefficient of thermal expansion should more closely match the base material to prevent separation between the surface layer and the base material. If the surface layer is near the thin end of the range, such matching is less important, since the layer more readily takes on the thermal characteristics of the base layer.

The strength of the concave surface, as used in this specification, is the ratio in the finished optic of: 1) the diameter of the clear aperture required, to 2) the base radius of the curve required. A strong curve approaches hemispheric, while a weak curve approaches plano. The present invention has particular utility with negative optics having a strength greater than approximately 1.4. Stated in another manner, the invention has particular utility with optical elements having a mechanical aperture that subtends ninety degrees or more (forty five degrees on each side of the optical axis) in contact with the pressing tool. The phrase high quality optical element refers to surface characteristics typical for optical instruments, including a figure that varies from design by only several fringes and a root mean square surface roughness in the tens of angstroms or better.

Figure 4:
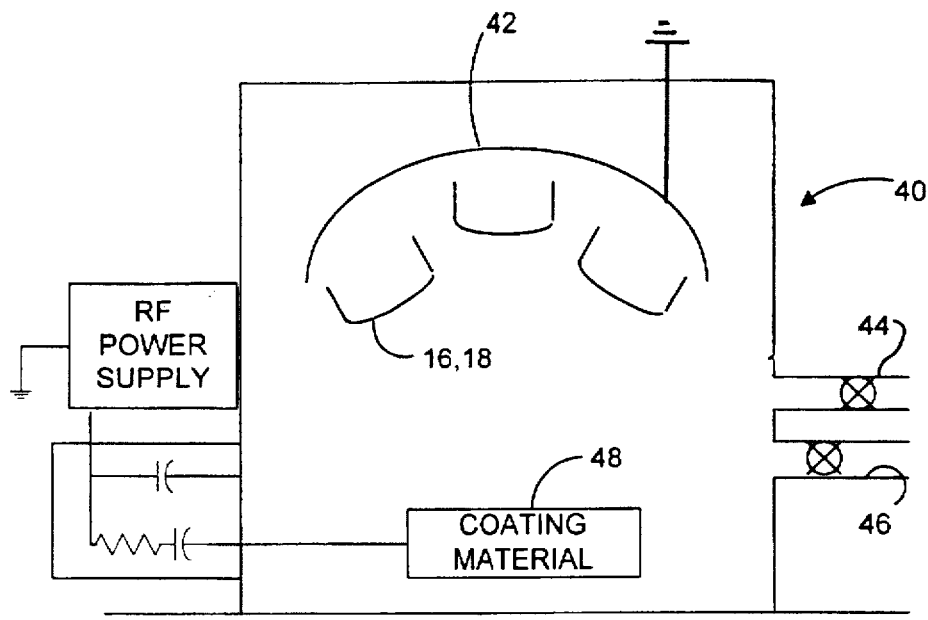
FIG. 4 is a schematic view of apparatus for coating the tools of FIGS. 2 and 3 according to the preferred embodiment.

Referring now to FIG. 4, a sputtering chamber 40 is depicted for depositing the surface layer 30 on the tool base material 28. A plurality of the tools 16, 18, electrically coupled as an anode, are supported under a tool holder 42. Exhaust 44 vacates the chamber and a carrier gas, preferably argon, is introduced through inlet 46. A source 48, such as alumina, is placed in the chamber, where it is electrically coupled as a cathode, and sputtered onto the tools until the thickness meets the requirements discussed above. Other suitable techniques may be employed for applying the surface layer, including ion plating and chemical vapor deposition.

According to one example of the invention, the preform is an LaF-71 glass having a coefficient of thermal expansion of seventy five times ten to the minus seven per degree centigrade ($75 \times 10^{-7}$/° C.). The tool is constructed from Invar having a sputtered surface layer of alumina. Other examples are: 1) tool steel with a sputtered coating of zirconia, 2) alumina with a sputtered coating of chromium oxide, and 3) steel with a sputtered coating of chromium carbide.

Figure 5:
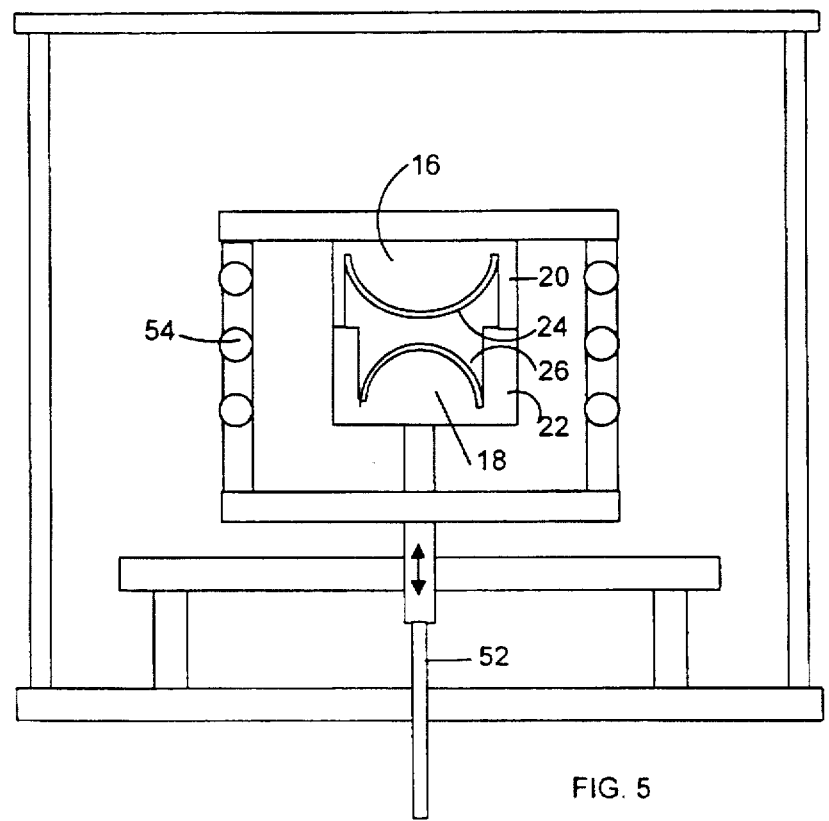
FIG. 5 is a schematic view of apparatus for molding precision optical elements from the preform of FIG. 1 according to the preferred embodiment.

FIG. 5 represents the pressure molding operation that converts the preform into a precision optical element by pressing the preform 12 against the tool surfaces 24 and 26. The upper and lower mold bodies, 20 and 22, respectively, are moved relative to one another by a piston 52, compressing the preform between the tool surfaces. Heating elements 54 heat the chamber during the process to approximately seven hundred degrees Celsius, for LaF-71 glass, or typically within a range of five hundred degrees Celsius to seven hundred degrees Celsius for other optical glasses. Again, the molding process and apparatus can be selected from known designs, including those disclosed, for example, in previously mentioned U.S. Pat. Nos. 3,833,347 and 4,168,961.

It should now be apparent that improved glass molding tools and methods are provided having features and advantages not previously available from the teaching of the prior art. The tools and methods greatly facilitate the molding of precision optical elements that include a strong negative surface without introducing undesirable stresses into the final product.

While the invention is described in connection with a preferred embodiment, other modifications and applications will occur to those skilled in the art. The claims should be interpreted to fairly cover all such modifications and applications within the true spirit and scope of the invention.

PARTS LIST

| Reference No. | Part |
|---|---|
| 12. | Preform |
| 14. | Mold |
| 16. | Upper mold tool |
| 18. | Lower mold tool |
| 20. | Upper mold body |
| 22. | Lower mold body |
| 24. | Upper tool surface |
| 26. | Lower tool surface |
| 28. | Core material |
| 29. | Core material |
| 30. | Surface layer |
| 31. | Surface layer |
| 40. | Sputtering chamber |
| 42. | Tool holder |
| 44. | Exhaust |
| 46. | Gas inlet |
| 48. | Source of surface layer material |
| 52. | Piston |
| 54. | Heating elements |

We claim:

1. A tool for pressing a surface of a glass preform, the glass having a predetermined coefficient of thermal expansion, into a strong concave surface of a precision optical element; characterized in that:

said tool (i) has at least one convex surface and is made of a base tool material having a coefficient of thermal expansion greater than the coefficient of thermal expansion of said glass; and (ii) has a coating surface layer with a thickness in the range of about ten angstroms to about two thousand angstroms, and a surface quality of a precision optical element, said coating being free from glass adhesion at temperatures of 500° C. and greater.

2. The invention of claim 1, wherein said glass has a coefficient of thermal expansion in the range of sixty times ten to the minus seven per degree centigrade to one hundred times ten to the minus seven per degree centigrade, and said tool material has a coefficient of thermal expansion in the range of seventy times ten to the minus seven per degree centigrade to one hundred and ten times ten to the minus seven per degree centigrade.

3. The invention of claim 2, wherein said tool material is selected from a group consisting of an iron-nickel alloy, steel, or alumina.

4. The invention of claim 1, wherein said tool includes a base material having a coefficient of thermal expansion greater than said glass, and a surface layer on said base material having a coefficient of thermal expansion greater than said glass.

5. The invention of claim 4, wherein said surface layer is a ceramic polished to precision optical quality, or that maintains the precision optical quality of the substrate or core.

6. The invention of claim 5, wherein said surface layer is selected from a group consisting of alumina, zirconia, chromium oxide and chromium carbide.

7. The invention of claim 6, wherein said surface layer has a finished thickness in the range of ten to two thousand angstroms.

8. The invention of claim 1, wherein said tool material is selected from a group consisting of an iron-nickel alloy, steel, or aluminum.

9. A tool of claim 1 wherein said coating is a ceramic coating.

* * * * *